United States Patent [19]

Genovese

[11] Patent Number: 5,291,318
[45] Date of Patent: Mar. 1, 1994

[54] HOLOGRAPHIC MEMBER FOR A REAL-TIME CLOCK IN A RASTER OUTPUT SCANNER

[75] Inventor: Frank C. Genovese, Fairport, N.Y.

[73] Assignee: Xerox Corporation, Stamford, Conn.

[21] Appl. No.: 970,408

[22] Filed: Nov. 2, 1992

[51] Int. Cl.⁵ .................. G02B 5/18; G02B 26/10; G02B 27/44

[52] U.S. Cl. .................. 359/17; 235/457; 359/205; 359/572; 359/575

[58] Field of Search .............. 359/17, 18, 19, 205, 359/572, 573, 575; 235/457

[56] References Cited

U.S. PATENT DOCUMENTS

| | | | |
|---|---|---|---|
| 4,003,636 | 1/1977 | Goshima et al. | 359/575 |
| 4,106,844 | 8/1978 | Bryngdahl et al. | 359/17 |
| 4,178,064 | 12/1979 | Mrdjen | 350/6.6 |
| 4,585,297 | 4/1986 | Hamaguchi et al. | 359/17 |
| 4,728,789 | 3/1988 | Broockman et al. | 359/18 |
| 4,758,058 | 7/1988 | Cato et al. | 359/18 |

*Primary Examiner*—Martin Lerner
*Attorney, Agent, or Firm*—R. Hutter

[57] ABSTRACT

A grating having holographic properties is employed in a pixel clock for a raster-output scanner. A pilot beam, off-axis from the writing beam creating a latent image on the photoreceptor, is focused on the grating. The grating is adapted to direct a portion of the pilot beam to a photodetector in a fixed point location. The holographic properties of the grating ensure that a wave associated with a reflected interference pattern is always directed at the photodetector throughout the scan path of the pilot beam.

10 Claims, 6 Drawing Sheets

HOLOGRAPHIC MEMBER FOR A REAL-TIME CLOCK IN A RASTER OUTPUT SCANNER

Cross-reference is made to the following co-pending U.S. patent application, incorporated herein by reference: Ser. No. 07/929,859, filed Aug. 17, 1992, entitled "Compound Optics for a Raster Output Scanner in an Electrophotographic Printer."

The present invention relates to optics for a raster output scanner (ROS) for creating electrostatic latent images from electronically stored data in, for example, an electrophotographic printer. More specifically, the invention relates to an optical arrangement for enabling extremely accurate real-time clock feedback for the processing of image data in a ROS.

Electrophotographic printers wherein a laser scan line is projected onto a photoconductive surface are well known. In the case of laser printers, facsimile machines, and the like, it is common to employ a raster output scanner (ROS) as a source of signals to be imaged on a pre-charged photoreceptor (a photosensitive plate, belt, or drum) for purposes of xerographic printing. The ROS includes a laser that generates a laser beam which is modulated (switched on and off) according to digital image data associated with the desired image to be printed as the beam is swept, or scans, across the photoreceptor. Commonly, the surface of the photoreceptor is selectively imagewise discharged by the laser beam in locations to be printed white, to form the desired latent image on the photoreceptor. The modulation of the beam to create the desired latent image on the photoreceptor is facilitated by digital electronic data controlling the modulation of the laser source. A common technique for effecting this scanning of the beam across the photoreceptor is to employ a rotating polygon mirror; the laser beam is reflected by the mirrored facets of the polygon, creating a sweeping motion of the beam, which forms a scan line across the photoreceptor. A large number of closely and equally spaced scan lines on a photoreceptor together form an exposure raster that is employed to create the desired latent image one line at a time. Once a latent image is formed on the photoreceptor, it is subsequently developed with a toner, and the developed toner image is transferred to a copy sheet, as in the process of electrophotography.

FIG. 7 shows the basic configuration of a scanning system used, for example, in an electrophotographic printer or facsimile machine. A laser source 10 produces a collimated laser beam, also referred to as a "writing beam" 12, which is reflected from the facets of a rotating polygon mirror 14. Each facet of the polygon mirror 14 in turn deflects the writing beam 12 to create an illuminated beam spot 16 on the pre-charged surface of photoreceptor 18. The system may further include additional optical elements such as focusing lenses 15. The energy of the beam spot 16 strikes particular locations on the surface of photoreceptor 18 that correspond to picture elements (pixels) in the desired image, discharging the surface for pixels which are to be printed white. When the beam is directed to strike locations having pixels which are to be printed black, the writing beam 12 is momentarily interrupted, by means of modulator 11 controlled by imagewise digital data, so the location on the surface of photoreceptor 18 will not be discharged. It is to be understood that gray levels are typically imaged in like manner by utilizing exposure levels intermediate between the "on" and "off" levels, and modulation may be affected through the operational level of the laser source itself as in the case of semiconductor laser diode.

When the beam spot 16 is caused, by the rotation of polygon mirror 14, to sweep across photoreceptor 18, a scan line 20 of selectively discharged areas results on photoreceptor 18. In FIG. 7, the photoreceptor 18 is shown as a rotating drum, but those skilled in the art will recognize that this general principle, and indeed the entire invention described herein, is applicable to situations wherein the exposing raster may be formed on an electrostatographic photoreceptor or various other light sensitive materials such as photographic film and paper, and the photosensitive medium may be in the form of a flat plate, a moving belt, or any other configuration. The surface of photoreceptor 18, whether it is a belt or drum, moves in a process direction; the sweep of spot 16 through each scan line 20 is transverse to the process direction. The periodic scanning of beam spot 16 across the moving photoreceptor 18 creates the array of scan lines 20, called a raster 22, on the photoreceptor 18, and point-by-point modulation of the exposure intensity forms the desired latent image to be printed. One skilled in the art will appreciate that such a configuration will typically further include any number of lenses and mirrors to accommodate a specific design.

In a typical commercially-available electrostatographic printing apparatus using a ROS, a preferred resolution for the image created on the photoreceptor 18 is on the order of 300 pixels, or spots, per inch (SPI) and higher. To fill up a page with an image of that resolution will, of course, require a relatively large quantity of data to be processed by the system. For this reason, and particularly in high-speed, high-resolution (for example, 600 SPI), and color printing systems, the accurate placement of spots on the photoreceptor in accordance with the image data is crucial for satisfactory image quality. In physical terms, the most important factor in achieving the accurate placement of charged or discharged areas on the photoreceptor 18 is the exact timing of the modulator controlling the writing beam in accordance with image data as the exposing spot sweeps across each scan line on the photosensitive surface. For this reason, various schemes have been proposed in the prior art for providing real-time feedback by which the angular displacement of the polygon in particular can be monitored and thus the exact control of the modulator can be adapted accordingly.

U.S. Pat. No. 4,178,064 discloses one possible type of timing correction system for use in the placement of image data on a photoreceptor, in which a second beam acting as a surrogate or test beam, and referred to as a "pilot" beam, reflecting from the same area of the same facet as the exposing beam is used to detect and compensate for anomalies in the position or velocity of the exposing spot in the scanned line through variable data timing. The pilot beam is arranged to strike an optical target consisting of a precision pattern of equally spaced opaque lines and spaces known in the art as a Ronchi ruling or grating and referred to functionally as a spatial encoder or linear encoder stripe. The interaction of the pilot beam, which is directly affected by the instantaneous orientation of the oscillating mirror (which is homologous to a polygon), with the spatially periodic optical pattern of the encoder stripe creates a real-time feedback signal which may be used to control the exact timing of image data through the system, and hence to create the desired image on the photoreceptor to great precision. In this type of system, the geometrical layout is carefully designed so that the writing and pilot beams interact with the optical components in the same way and hence undergo identical distortions and perturbations in parallel. When properly executed, the exact position of the writing beam may then be accurately inferred at any moment by determining the location of the pilot beam with respect to the pattern of the encoder stripe.

Although such a two-beam system providing a real-time feedback signal from the encoder stripe for precision pixel placement is well known in the art and has been commercially applied for very high quality imaging applications, there are practicalities which limit the usefulness of the basic concept in many engineering situations. Although the pilot beam and writing beam may in fact both reflect from identical areas of the mirror or polygon at the same instant of time, the two beams are in most known designs set at slightly different angles with respect to each other. Typically, the writing beam path is made to be exactly perpendicular to the rotational axis of the polygon mirror such that it strikes the surface of the mirror or facet head on, whereas the pilot beam is disposed obliquely relative to the facet. Thus, while the reflected writing beam scans in a path that is substantially straight on the surface of the photoreceptor, the beam spot created by the pilot beam will follow a distinctly bowed path on the surface of the off-axis encoder stripe or grating. For the simplest and most commonly used scanning geometry, however, the differential path length caused by the bow compensates for the differential speed variation of the pilot scan along its curved path to an excellent approximation, so the only major practical concern for the grating design is to provide an active encoder stripe area wide enough to accommodate the geometric bow of the pilot beam. It should be clear that as long as the differential motions of the writing beam and the pilot beam can be represented by a one-to-one mapping, the pattern of lines on the encoder stripe can always be configured so that they correspond to exactly uniform displacements of the writing beam along its straight path on the photoreceptor.

A more troublesome problem from a product-design standpoint is that of efficiently "collecting" the optical flux once the pilot beam has interacted with the encoder pattern so that it may be detected and used in a data-control system. The solution of simply using a long photodetector which is substantially coterminous with the encoder stripe itself has been found to be unacceptable because of the slow response speed associated with available large area photodetectors as a consequence of their inherent capacitive structure. In essence, large area photodetection devices act like low-pass filters so that the miniscule electrical current signal that could have otherwise been derived from a pilot beam of modest flux level after having been spatially modulated or "chopped" by the pattern of lines on the encoder stripe will be attenuated, delayed, and distorted to an extent that the detection scheme is unusable.

In order to take advantage of the low noise and fast response of much smaller photodetector devices, numerous schemes employing lenses and mirrors have been devised to redirect the light flux exiting the encoder grating and make it converge on a relatively small area. Such optical elements obviously add both complexity and expense to the system, in that they must be properly mounted and aligned. More importantly, these elements add extra physical volume to a scanner architecture, especially in the immediate vicinity of the imaging photoreceptor surface which is typically crowded with other essential electrostatographic modules. There is therefore a need for a compact, simple, and accurate arrangement for exploiting the linear encoder position sensing principle in a ROS scanning system while allowing the light interacting with the encoder to be detected accurately by a rapidly responding electrical component.

According to one aspect of the present invention, there is provided a member for directing a portion of a light beam incident from a fixed source toward a fixed external location. The member comprises an optical diffraction grating adapted to receive the incident light beam and interferometrically reconstruct a light wavefront directed toward the fixed external location. The optical diffraction grating has a variable pitch dependent on the angular position of the area on the grating relative to the fixed external location. A set of blanked-out areas are defined within the grating to serve as a pixel-clock when a beam spot moves across the grating.

According to another aspect of the present invention, there is provided a member for directing a portion of a light beam from a fixed source incident thereon toward first and second fixed external locations. A first diffraction grating is adapted to receive the light beam and form a reconstructed light wavefront directed toward the first fixed external location, the diffraction grating having a variable pitch and orientation dependent on the angular position of the area on the member relative to the first fixed external location. A second diffraction grating is adapted to receive the light beam and form a reconstructed light wavefront directed toward the second fixed external location, the diffraction grating having a variable pitch and orientation dependent on the angular position of the area on the member relative to the second fixed external location. The first and second diffraction gratings are arranged in an interleaved fashion along the member, whereby an incident light beam spot scanning along the member will be interferometrically reconstructed to form light wavefronts directed alternately to the first external location and the second external location.

According to another aspect of the present invention, there is provided, in a raster output system wherein a writing beam modulated in accordance with image data is deflected by a moving reflecting surface and caused to scan across a photosensitive surface, means for causing a pilot beam to reflect from substantially the same location on the reflecting surface as the writing beam at a given time. Encoder means are adapted to interact with the reflected pilot beam to create an optical signal indicative of the behavior of the writing beam relative to the photosensitive surface. Light collection means are provided for directing light associated with the optical signal toward one or more fixed points for detection. The light collection means include diffraction means for reconstructing light wavefronts directed toward the fixed points in response to the pilot beam focused thereon.

Figure 3A:
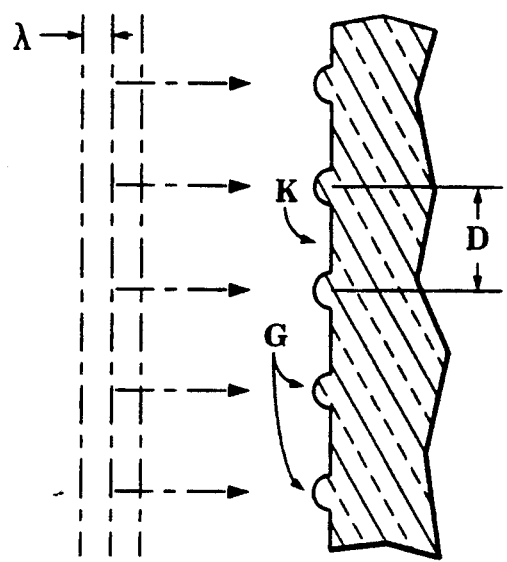
Figure 3B:
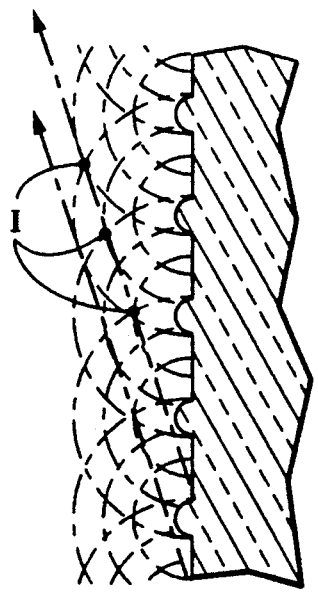
Figure 3C:
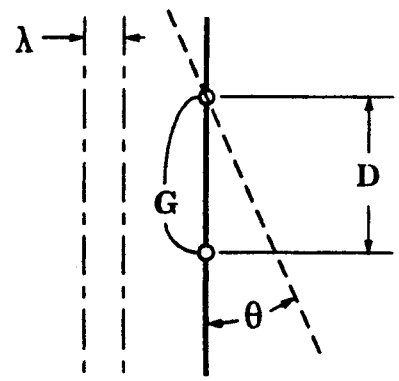
Figure 4:
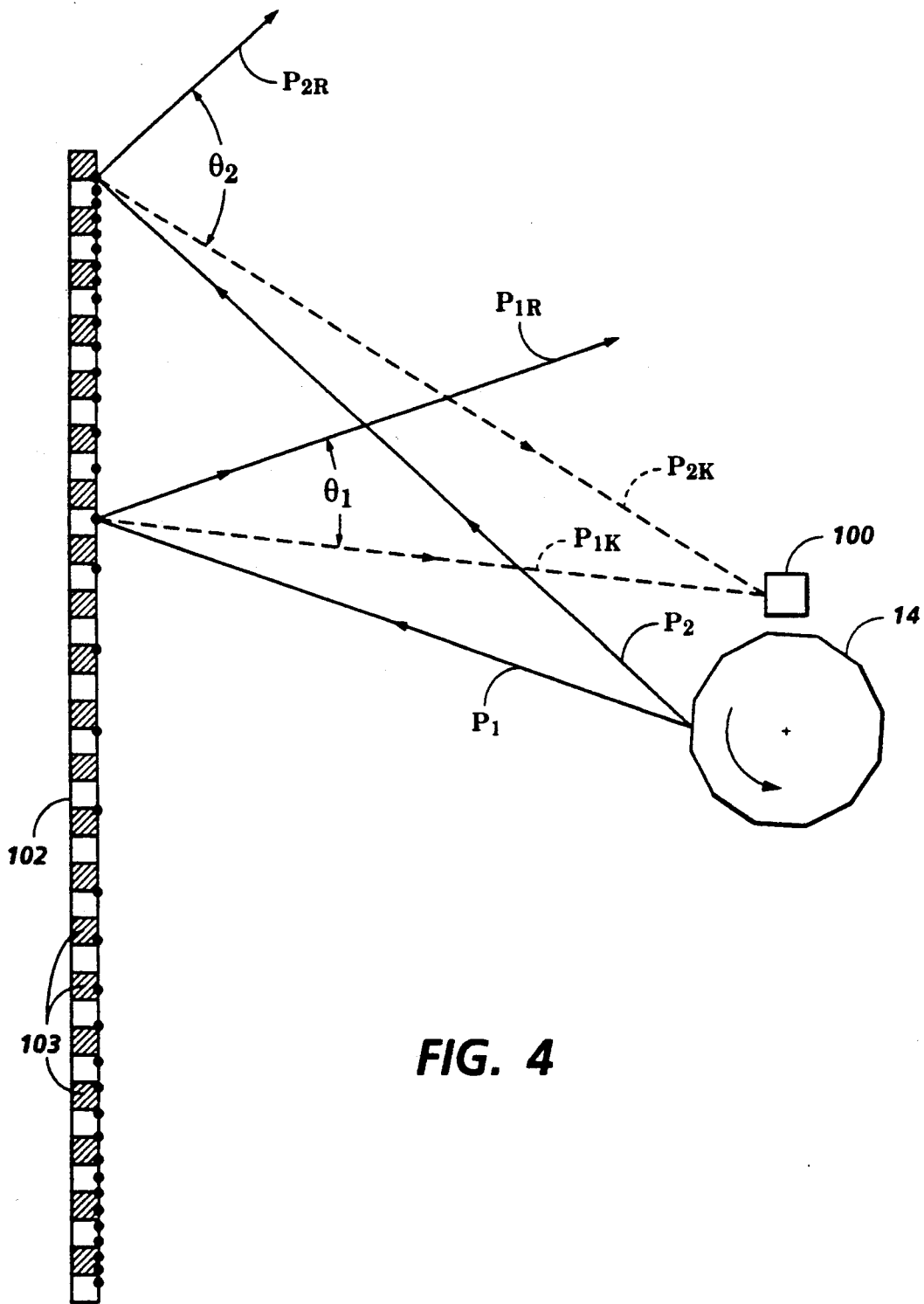
Figure 5:
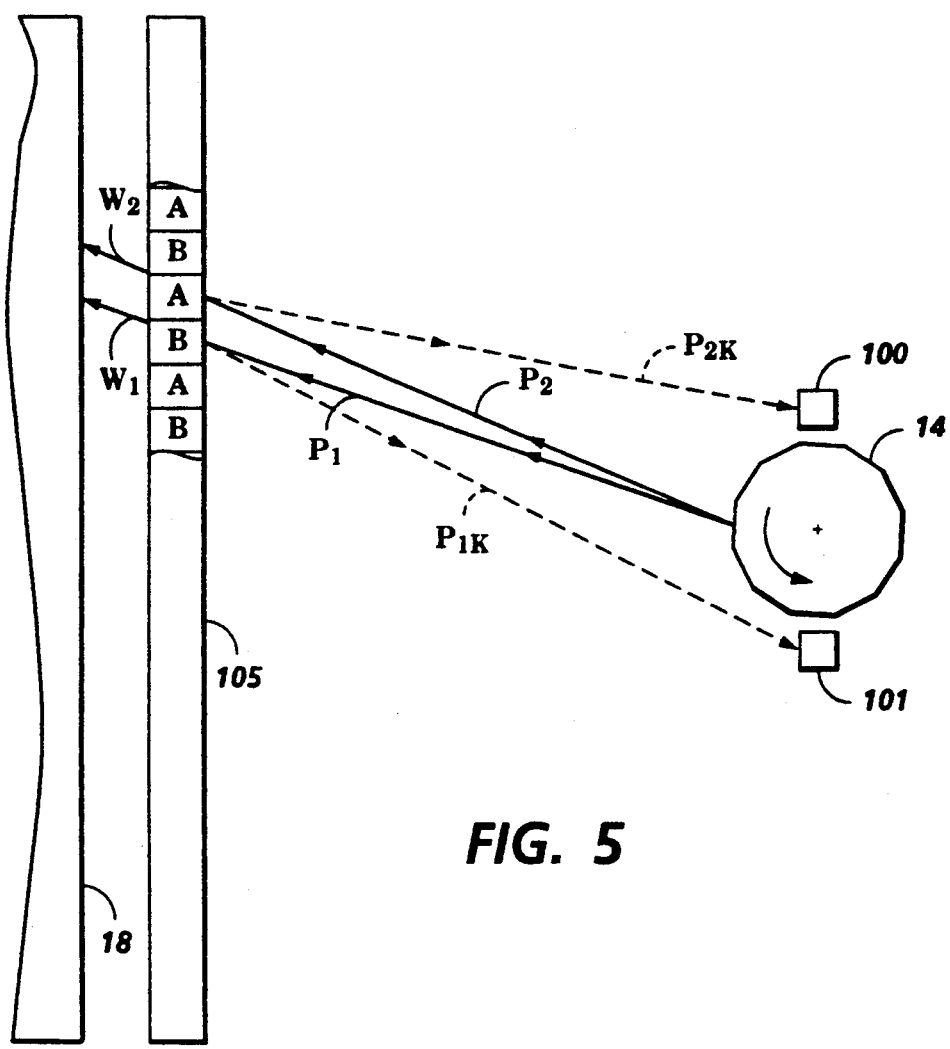
Figure 6A:
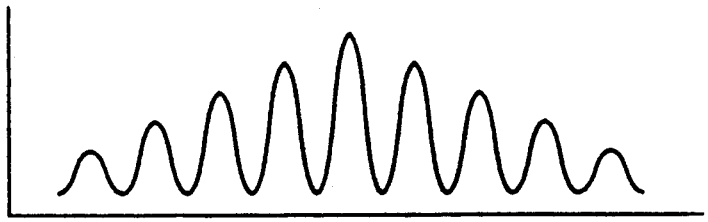
Figure 6B:
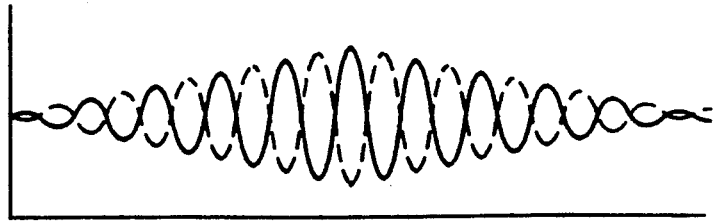
Figure 7:
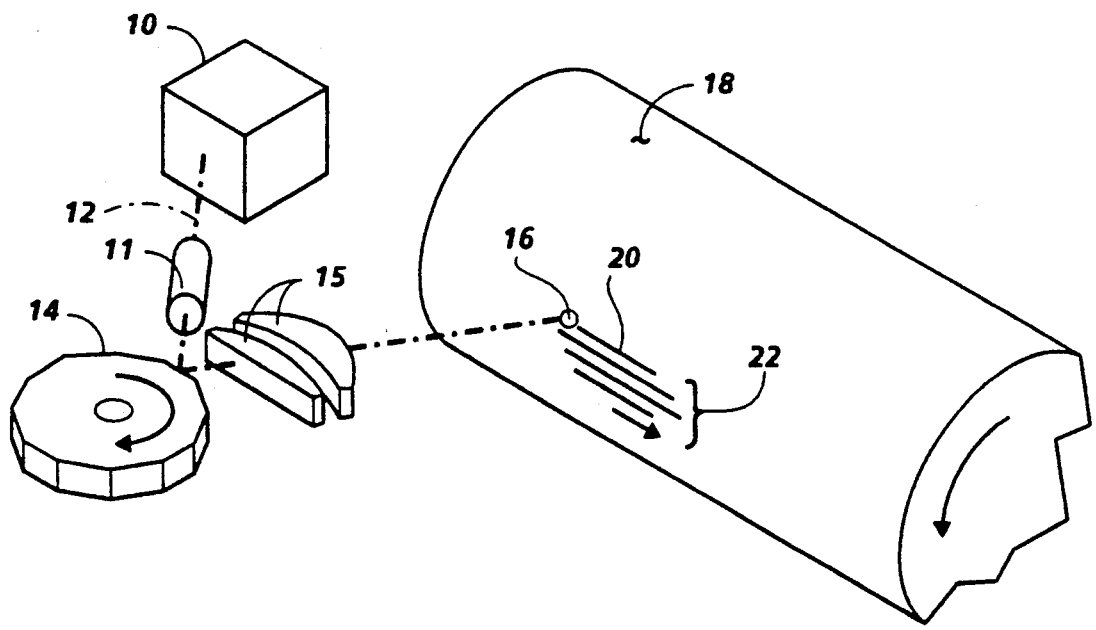

FIGS. 3A-C are simplified cross-sectional views of a holographic grating, illustrating the principle of a kinogram as used in one embodiment of the present invention;

FIG. 4 is an elevational view of a holographic member according to the present invention, as used with a pilot beam reflecting from a rotating polygon;

FIG. 5 is an elevational view of a holographic member according to another embodiment of the present invention, in the context of a ROS system;

FIGS. 6A-B are simplified graphs illustrating the signal variation problem associated with a pilot beam system; and FIG. 7 is an perspective view showing the basic elements of a prior-art ROS system.

In the Figures, like reference numerals indicate like elements.

Figure 1:
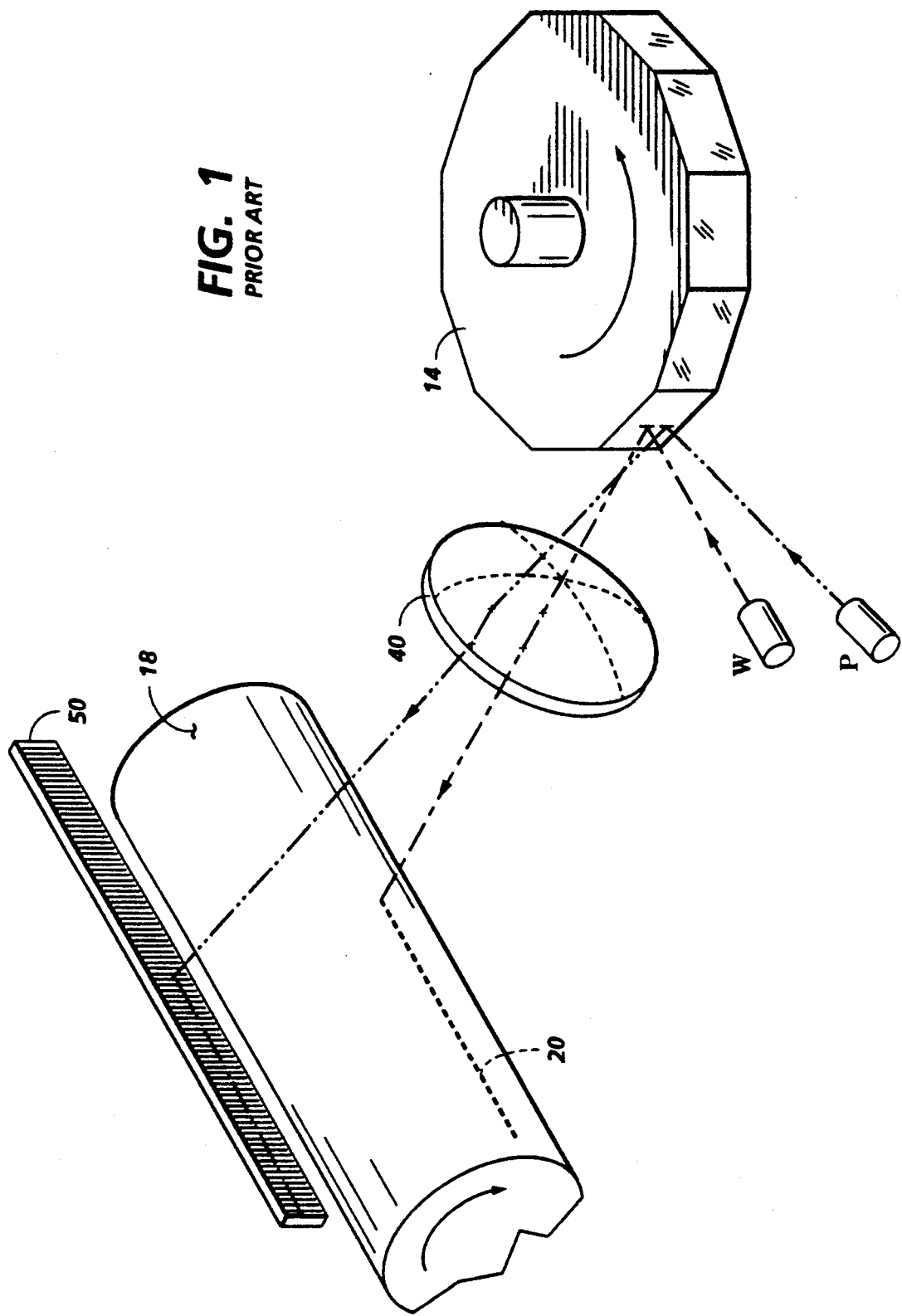
FIG. 1 is a perspective view illustrating the general principle of an off-axis pilot beam as used in a ROS system.

FIG. 1 shows the basic elements of a ROS system which are directly relevant to the present invention. A writing beam W, which is modulated according to image data, is arranged to reflect from one of a plurality of mirror facets of rotating polygon 14 or an equivalent galvonometer mirror in such a manner as to create a substantially straight repetitive scan line 20 along the surface of photoreceptor 18. Simultaneously, a pilot beam P is caused to reflect from substantially the same location on the facet as writing beam W, but the pilot beam P is angled or inclined slightly so that it diverges from the optical axis of focal lens 40 to strike encoder grating 50 positioned closely adjacent to scan line 20. As in U.S. Pat. No. 4,178,064, this encoder grating 50 includes thereon a regular periodic optical signature with which the scanning pilot beam P interacts to yield a modulated optical signal which may be detected, monitored, and used as a real-time indicator of the position of beam spot 16 for precise control of the modulation of writing beam W.

It will be noticed that, because of the incident angle of pilot beam P on the facet of polygon 14, the scan path of beam P on encoder grating 50 will have a distinct bow associated therewith, as opposed to the theoretically straight scan line 20 of writing beam W on photoreceptor 18. It should also be noticed that, for accurate monitoring of the position of the pilot beam in a way that is useful for inferring the precise behavior of the writing beam W, the encoder grating 50 must be disposed within substantially the same focal plane as the location where the writing beam W is focused on photoreceptor 18, or at least its optical equivalent through the use of path folding mirrors. To place the encoder grating 50 closer to the focal lens 40 than the photoreceptor 18 will require either an encoder pitch of higher spatial periodicity than the desired spacing of pixels on the photoreceptor 18, or, if a coarser encoder grating pitch is employed, the use of electronic pulse rate synthesis techniques, such as might be supplied by a phase-locked loop circuit, in order to infer the position of the writing beam W with respect to the desired pixel positions on photoreceptor 18.

Figure 2:
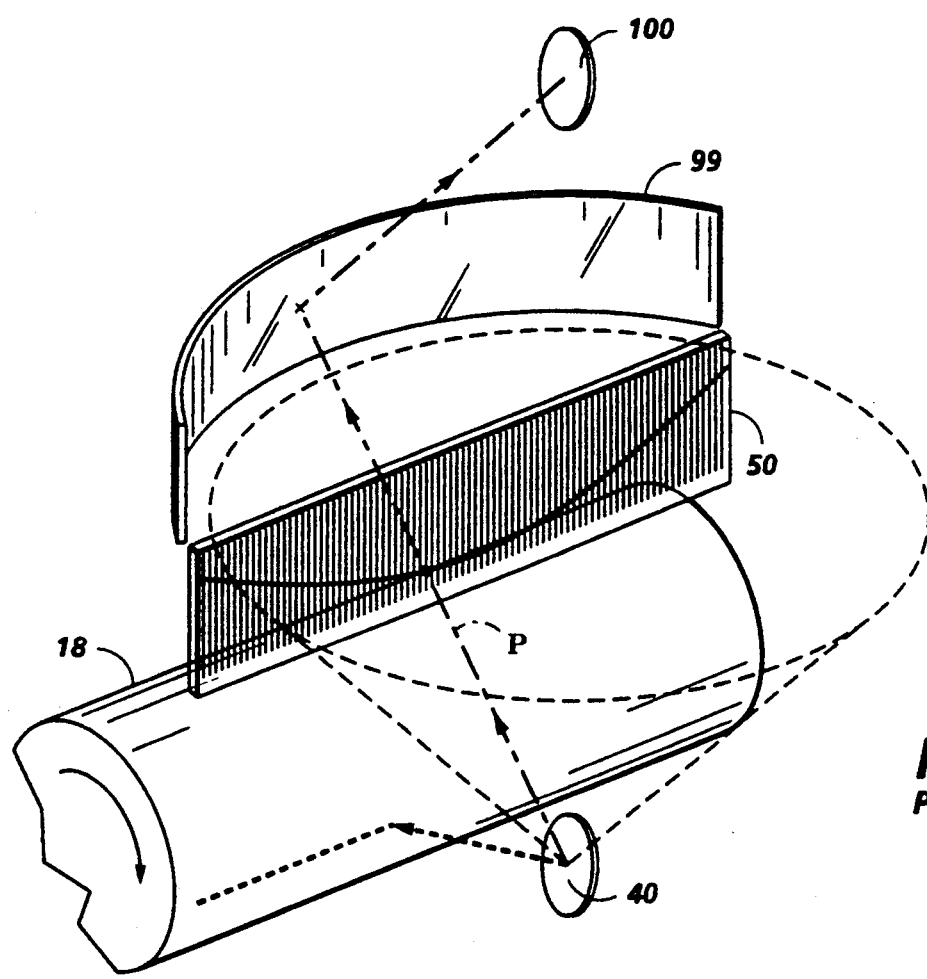
FIG. 2 is a perspective view illustrating problems of scan line bow and light collection for off-axis pilot beam as used in a ROS system.

FIG. 2 is another view of the optical arrangement associated with an off-axis pilot beam. The figure shows that, at a relatively large angle relative to the writing beam, the bow of pilot beam P projected on encoder grating 50 can be highly pronounced, implying that the active area of encoder grating 50 must either be equally bowed to match the curvature of the projected scan trace, or sufficiently wide to accommodate the trace curvature entirely within its borders. Further, in order to "collect" the pilot beam P, after it has interacted with encoder grating 50, on a relatively small photodetector 100, the light must somehow be brought to a common locus from any point along the scan path by an arrangement such as the curved mirror shown as 99, or, alternately, an arrangement of converging lenses and mirrors with the same optical effect. Obviously, any lens having the same optical effect as mirror 99, such as a Fresnel lens or flat disk lens, must be physically large enough to be functional across the entire possible scan length of the pilot beam P. Such a lens or mirror arrangement will, by necessity, occupy a large volume in a scanning system.

According to the present invention, there is provided a holographic means for causing a scanned beam such as pilot beam P to converge toward at least one predetermined point where a photodetector of relatively small dimentions and therefore high response speed may be placed. FIGS. 3A-C illustrate the general principle of a reflective "kinogram," a type of hologram composed to fine lines of surface relief (typically replicated from a master fabricated by microelectronic etching techniques) and designed to function as a reflective optical interference grating. A familiar type of kinogram can be found in the anti-counterfeiting emblem placed on many credit cards, in which a three-dimensional pictorial representation is created by fine ridges in the embossed surface. The line-to-line spacing, or pitch D, also known as the grating constant, is roughly comparable in magnitude to the wavelength of light being reflected thereon. In short, a kinogram is a specialized type of diffraction grating. In FIG. 3A is shown a kinographic grating generally indicated as K, having defined in a surface thereof a surface relief pattern of grating elements G in the form of ridges or grooves which are shown end-on in the figures. Interferometrically spaced grating elements G should be distinguished from the much larger and regularly spaced optical elements of encoder stripe 50 used to determine the position of the pilot beam P shown in other figures, although, in the preferred embodiment of the present invention, both types of elements are functionally combined in a single member. Although pitch D is prescribed mathematically and has a unique value at each position along the scan, the ridges in kinogram k within each small local area can be treated as being regularly spaced. Distance D is typically on the order of 1-2 $\mu$m, which is to be compared to a typical wavelength for a laser used in the ROS context, which is about 0.672 $\mu$m. The relative magnitudes of the pitch D and the wavelength of light, indicated as $\lambda$, establishes an associated optical beam redirection or deflection angle through the mechanism of lightwave diffraction for purposes of the present invention.

In FIG. 3 is shown a coherent wave front of light flux representing pilot beam P incident on the surface structure of kinogram K. FIG. 3B shows what happens when such an incident wave is coherently scattered from a series of uniformly spaced kinographic elements G. When considered end-on, as shown in FIG. 3B, elements G act as a series of scattering centers, each generating a separate outgoing wave front of the same wavelength $\lambda$ as the incident wave, and of fixed phase relationship with respect to each other because of the well defined phase of the wave incident at each scattering point. As is well known from light diffraction theory, constructive and destructive interference between individual outgoing waves in fixed phase relationships leads to outgoing directions where the emitted contributions add constructively, giving rise to reinforced wave intensites in those directions, which may be loosely referred to as output beams. The general case of a periodic structure yields multiple directions where this geometric constructive or wave reinforcing mechanism can be seen to take place. Angular directions intermediate between reinforced directions suffer the opposite in that destructive interference robs them of intensity since, in the intermediate directions, individual wave components tend to mutually cancel rather than reinforce each other. A plurality of interference maxima with both positive and negative angles are theoretically present in the general case, and the various output beams are labeled by an index "N" according to the magnitude of the diffraction angle, starting with the undiffracted remainder of the original beam referred to as the zeroeth order (N=0). Only one of the two first-order diffracted beams (N=±1) is of practical interest for the present invention.

The existence of both positive and negative interference maxima is a consequence of the symmetry of the emanations from the different scattering points. It follows that an inherent asymmetry in the nature of the scattering centers themselves alters the proportions of light flux emanating in one direction over another. This asymmetry will, without changing the angles of the various diffracted orders, cause the light intensity or flux in some orders to be enhanced at the expense of others. The technique of adjusting the shape of the scattering center profiles so that a preponderance of the total scattered energy is directed into a single diffraction order is referred to as "blazing." In essence, the localized surface slope is adjusted so that most of the zero order energy as well as that of the unused higher orders is concentrated in the desired output beam. For a transmission diffraction grating, the sloped areas resemble microscopic prisms that behave in concert like juxtaposed segments of an ordinary lens to direct light flux in the desired direction. As can be appreciated, the optimum wedge angles depend on the refractive index of the material from which the tiny wedges are fabricated.

By contrast, the sloped areas of a reflective diffraction grating are oriented to function like microscopic mirror elements behaving in concert like adjacent areas of a curved optical reflector designed to direct light flux in the desired direction. The reflective type grating benefits from high intrinsic surface reflectivity which in the case of a replicated plastic kinogram, for example, can be enhanced by a thin overcoating of vacuum evaporated metal. In either the reflection or transmission type device, the surface slopes are generated by successive etching steps under control of delimiting microlithographic photomask artwork that yields terraced structures approximating the desired sloped or wedge shaped surface profiles. Although the stepped approximation to a true slope is imperfect, the efficiency of kinograms made with this process, that is, the total fraction of incident light power that is redirected in a specific direction, can be as high as 85%.

FIG. 3C is a simplified view showing the effect of two individual scattering centers G interacting with a wave front of wavelength $\lambda$. (The general principle shown in the Figure applies equally well to transmission and reflection.) In FIG. 3C, $\theta$ is the angle of the first-order diffracted wave front. From simple wave theory $\sin \theta = \lambda/D$, where $\lambda$ is the lightflux wavelength and D the spacing or pitch of the scattering centers, assumed constant for the purposes of the figure. Thus both the wavelength and kinogram pitch at a particular point have a direct effect on the angle $\theta$ of the emitted beam transmitted or reflected by the kinogram. The use of diffraction gratings for spectroscopically dispersing light flux according to wavelength for analysis purposes is well known. Conversely, at any given wavelength, the pitch D and orientation of the scattering centers may be chosen to control the direction of the output wave front, and independently specified for each particular portion of the kinogram.

FIG. 4 shows how a kinogram 102 extending the length of the scan path of a pilot beam P can be used to redirect light flux toward a photodetector 100. In the diagram, pilot beams $P_1$ and $P_2$ and shown reflected from a rotating polygon 14, as would occur at different portions of the scan path in a typical ROS arrangement. Looking first at pilot beam $P_1$, it is to be noted that if kinogram 102 were merely a mirror surface, pilot beam $P_1$ would be reflected specularly, and proceed along path $P_1R$ since the law of simple reflection demands that the angle of reflection equal the angle of incidence. However, kinogram 102 is specifically tailored such that when struck at any point by pilot beam $P_1$ from rotating polygon 14, instead of the specular reflection $P_1R$, most of the incident light flux is instead directed to photodetector 100, through the mechanism of constructive diffractive interference by the kinogram and enhanced by blazing. This path is indicated in FIG. 4 by line $P_1K$. The angular difference $\theta_1$ between the specular reflection ray path $P_1R$ and the kinogram ray path $P_1K$ is specified by the spacing, or pitch D at the particular point at which the pilot beam strikes the kinogram surface. When photodetector 100 lies outside the scanning plane, it can be seen that satisfaction of the vector components needed to direct ray $P_1K$ toward the photodetector location is provided by the orientation of the kinographic microstructure at each point. Similarly, a more oblique pilot beam path $P_2$ would ordinarily be specularly reflected along path $P_2R$, but by adjusting the pitch D and orientation of the diffractive structure where the incident pilot path $P_2$ strikes kinogram 102 the light flux can be directed instead along ray path $P_2K$ to be detected by photodetector 100. From these two examples, it may be easily inferred that, for the purpose of geometrically manipulating light flux paths in a ROS scanner, such a kinogram 102 will have finer diffractive pitch at the ends of the scan naturally associated with larger angular displacements, and progressively coarser diffractive pitch toward the central portions of the scan due to the smaller diffraction angles needed for the central part of typical ROS geometry. In this way, the relatively compact kinogram 102, which is essentially a surface with a position-dependent diffraction grating impressed therein, can be used to efficiently and accurately redirect the flux of a pilot beam P towards a fixed position in space occupied by a small area photoreceptor.

In order to use a kinogram such as 102 for real-time clock purposes, in the manner of the prior art "encoder" grating, the function of kinographic beam redirection can be spatially modulated in a regular evenly spaced or aperiodic fashion, as dictated by the application, to provide the same timing function benefits as the position sensing encoder described in the prior art, but without the need for auxiliary light collection elements. The extremely fine kinographic structure is arranged to redirect the flux of the pilot beam toward a photodetector through the mechanism of light diffraction, while the effectiveness or specific angle of redirection varies in relatively large "pixel-size" domains that form the encoder elements such as 50 in FIG. 2 which are used for real-time clock purposes. In practical terms, assuming a standard ROS laser having a wavelength of 0.672 μm, a desired angular redirection of 25 degrees would require a spacing D for the kinographic elements on the order of 1.5 microns. For a real-time encoder stripe designed for 600 pixels per inch, the encoder elements or holographic domains would be spaced at a pitch of about 42.3 μm. Thus, in a typical embodiment of the present invention, there will be an approximately 30:1 ratio between the dimentions of an encoder element and the spacing of individual kinographic ridges or grooves within that encoder element.

One simple technique for combining the encoder function with the kinographic redirection property provided by 102 is simply to start with the basic kinogram 102 and disrupt the redirection property in a regular repetitive pattern corresponding to the pixel size in the image. The non-functional areas can be "blanked out" with light-absorbing (or, at least, non-kinographic) material, or the blanked-out areas may be simply omitted in fabrication, so that when the pilot beam P is scanned across the structure, the redirected light flux oscillates between "on" and "off" in intensity as the pilot beam strikes redirective and inoperative areas in succession. These blanked-out areas are implied in FIG. 4 by the regularly-spaced stripes 103 shown on the side of kinogram 102. (The holographic grating of kinogram 102 is suggested in FIG. 4 by the set of dots on the edge facing the polygon; these dots are, obviously, not to scale as ridges of a holographic grating.) The modulated intensity of the redirected beam may then be exploited for encoding purposes in a matter known in the art. Preferably the blanked-out areas are dimensioned integrally with the positions of pixels formed on the photoreceptor 18, so that a "pixel clock" timing the output flow of image data causing the pixelwise modulation of the writing beam may be easily designed. This straight-forward on-and-off modulation technique, however, has in general shown to have a practical disadvantage in that the threshold level for sensing the state of the redirected light from the kinographic encoder stripe is critical. This is because the redirection efficiency of a kinogram as currently practiced depends on the geometry of the incident beam as well as the redirection angle and the intrinsic condition of the surface relief which is not necessarily uniform everywhere. As a result, the redirected beam intensity incident on the photodetector from the central portions of the scan line will be measurably greater than that from the ends of the scan line, and may fluctuate stochastically as a function of position along the scan. As a result, even if a sensing threshold is chosen where no transitions between the "on" and "off" states are lost, the variation in average light flux intensity on the photodetector will cause small shifts in the timing of the electronic response to the transitions.

In order to eliminate the timing variation due to the fluctuations in means intensity at the sensor, it is preferred that a compound kinogram with "interleaved" holographic domains be used. Such an interleaved kinographic structure is shown in FIG. 5. The principle of the interleaved domains can be conceptualized as a single elongated stripe whereon there are in fact provided two kinograms, a first kinogram adapted to always direct light incident thereon (more specifically, to redirect incident light flux through the mechanism of physical optical wave interference) towards a photodetector in a first position, and a second kinogram, which is configured to always redirect light toward a second, separate photodetector, in a separate location. These two kinograms are then interleaved, preferably on a pixel-by-pixel (or whole multiple of pixels) pitch, on a single elongated stripe so that when a pilot beam P scans across the interleaved structure, the reconstructed wavefront from every other domain will be directed toward one photodetector while the intervening domains will direct light flux toward the other photodetector. In FIG. 5 it can be seen that an interleaved kinogram 105 includes alternating pixel-sized areas marked A and B representing the two distinct species of kinographic domains. As shown in the diagram, when the incident pilot beam such as shown in position $P_1$ is directed toward a section marked "A," the reconstructed wave $P_1K$ is directed toward the photodetector 100. However, when the incident pilot beam in a position such as $P_2$ strikes an area marked "B" of the kinogram 105, the reconstructed wave $P_2K$ is directed toward a second photodetector 101. Thus, as a single pilot beam scans continuously across surface of interleaved kinogram 105, an oscillating bidirectional pattern of reconstructed wavefronts will result that are nominally 180 degrees out of phase with respect to each other, with the output light flux being directed first toward photodetector 100 and then photodetector 101 in a continuous alternating sequence. The alternating light flux intensities incident on the photodetectors 100 and 101 generate corresponding photocurrents which are electronically compared in level. The crossover points in time where the 180 degree out of phase amplitudes $P_1K$ and $P_2K$ exactly match and precisely define the condition where the pilot beam P intersects the boundaries between domains of type "A" and "B", indicating by inference the optimum timing of the output of image data to writing beam W for the accurate positioning of points of exposure along the scan lines in spite of any systematic fluctuations in kinographic efficiency. It will be understood by those familiar with the sensing art that the differential method of comparing opposing alternating intensities also has the well established advantage that it is relatively insensitive to changes in the mean intensity level of the pilot beam itself, such as might be caused by variations in temperature or associated with aging. In addition, common mode perturbations such as low level background illumination incident on the photodetectors, from light leaks and other inadvertant sources, are rejected as long as they are within reasonable limits.

Also shown in FIG. 5 is a portion of a photoreceptor 18 accepting writing beams $W_1$ and $W_2$, which correspond respectively to pilot beams $P_1$ and $P_2$, such as in the manner shown in FIG. 1, wherein the pilot beams are off-axis relative to the writing beams. In the view of FIG. 5, the writing beams are in effect "under" the pilot beams as shown. Because of the angular difference between these two types of beams, the pilot beams are directed to the kinogram 105 and the writing beams are directed to the photoreceptor 18 to create the latent image thereon. Although the view of FIG. 5 shows, for illustration purposes, the surface of the photoreceptor to be "behind" the kinogram 105, the two surfaces are preferably arranged to be substantially in the same plane.

FIGS. 6A and 6B are comparative graphs, wherein the x-axis in each case represents a period of time corresponding to the length of the scan line of a pilot beam on the encoder stripe, and the y-axis represents the intensity of light detected by one of the photodetectors such as 100 or 101 in FIG. 5. FIG. 6A generally shows the problem of a variable signal amplitude indicating its fluctuation along a scan line, in that a weaker signal is generated at both ends of the scan, just because the scan geometry requires larger wave reconstruction angles which are associated with lower light flux conversion efficiency. In addition to the gradual signal drop off toward the ends of the scan, FIG. 6A also illustrates areas where the signal is locally attenuated compared to the ideal signal level. Both effects lead to a sensitivity of the response of the system to the choice of the threshold level, the electronic value used to define the demarcation between the "on" and "off" states in a single beam design. FIG. 6B is a superimposition of the two out-of-phase photocurrents derived from photodetectors 100 and 101 separately. In the differential method in which the photocurrent levels generated by two photodetectors are compared, what matters is not the absolute value of the light signal intensities detected by the photodetectors, but satisfaction of the condition that the two intensities, oscillating in exact opposition or out of phase by 180 degrees, precisely match in amplitude which corresponds to the periodically spaced intersections of the two photodetector signals in FIG. 6B. It is well known that the points in time where opposing signals of equal amplitude match is independent of their actual magnitude. Thus detecting the intersections of the two signals for data timing purposes yields a much more robust and reliable system design from the point of view of engineering tolerances than the use of either of the signals individually.

The property of holographic kinograms (and gratings in general) that is utilized in the present invention for redirecting a narrow beam of light to one or two chosen points in space can be expanded to include an arbitrary number of target points at arbitrary locations, and in arbitrary order. In other words, the kinographic domains can be arranged as needed without restriction. However, the design of each individual domain is based on a specific incident wavefront condition, a given light wavelength, and a well defined direction of incidence in order that the grating constant D and the orientation of the grating elements G can be computed for a given choice of target location. As a consequence, the design of a single or multiple beam kinographic encoder of the present invention is understood to be tailored for a specific scanner geometry.

Another advantage of the kinogram system of the present invention is that, compared to the alternatives of traditional optical elements such as curved mirrors and lenses, the kinographic encoder is no larger than a conventional transmission or reflection encoder stripe, allowing it to be placed in very close proximity to the area where the writing beam W discharges the photoreceptor 18 without additional optical components. As a consequence, the off-axis pilot beam P need only diverge slightly from the scanning plane of the writing beam W, thus considerably lessening the inevitable scan blow associated with the pilot beam so that coincidently, the width of the kinogram 105 can be relatively narrow. Additionally, mirrors commonly used to fold the scan path and direct the writing beam to the photoreceptor surface in tight or awkward architectures can, with little or no increase in size, serve to also direct the pilot beam to the kinogram as well as provide a natural path for returning the redirected flux to photodetector devices which can be conveniently mounted adjacent to the scan lens.

While the present invention has been described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

I claim:

1. An optical element for directing a portion of a light beam from a fixed source toward first and second fixed external locations, comprising:

an elongated member;

a first grating, adapted to receive light from the fixed source and form an interference pattern forming a light wave toward the first fixed external location, the first grating having a variable pitch dependent on the angular position of an area of the first grating relative to the first fixed external location; and a second grating, adapted to receive light from the fixed source and form an interference pattern forming a light wave toward the second fixed external location, the second grating having a variable pitch dependent on the angular position of an area of the first grating relative to the second fixed external location;

the first and second gratings being arranged in an interleaved fashion along the member, whereby a light beam spot moving along the member will cause an interference pattern forming a light wave to be directed alternately to the first external location and the second external location.

2. A raster output system of the type having a writing beam modulated in accordance with image data and reflected from a reflecting surface and caused to scan across a photosensitive surface, and a pilot beam reflected from substantially the same location of the reflecting surface as the writing beam at a given time, the improvement comprising:

encoder means having an optical pattern thereon, the optical pattern adapted to interact with the reflected pilot beam scanning across the optical pattern to create an optical signal indicative of the behavior of the writing beam relative to the photosensitive surface; and light collection means for directing light associated with the optical signal toward a fixed point, the light collection means including diffraction means for directing an interference pattern forming a light wave toward the fixed point in response to the pilot beam interacting with the light collection means.

3. The improvement as in claim 2, wherein the diffraction means includes a grating, adapted to direct an interference pattern forming a light wave toward the fixed point in response to the pilot beam focused on the grating, the grating having a variable pitch dependent on the angular position of an area on the grating relative to the fixed point.

4. The improvement as in claim 3, wherein the encoder means comprises a grating having a series of blank areas thereon.

5. The improvement as in claim 4, wherein the series of blank areas on the grating is dimensioned integrally with pixels on the photosensitive surface.

6. The improvement as in claim 4, further comprising a photodetector located at the fixed point.

7. The improvement as in claim 2, wherein the diffraction means includes:
   an elongated member;
   a first grating, adapted to receive the pilot beam and form an interference pattern forming a light wave toward a first fixed external location, the first grating having a variable pitch dependent on the angular position of an area of the first grating relative to the first fixed external location; and
   a second grating, adapted to receive the pilot beam and form an interference pattern forming a light wave toward a second fixed external location, the second grating having a variable pitch dependent on the angular position of an area of the second grating relative to the second fixed external location, with the first and second gratings being arranged in an interleaved fashion along the member, whereby the pilot beam moving along the member will cause an interference pattern forming a light wave to be directed alternately to the first external location and the second external location.

8. The improvement as in claim 7, wherein portions of the first grating and the second grating are interleaved and the interleaved portions of the first grating and the second grating are dimensioned integrally with pixels on the photosensitive surface.

9. The improvement as in claim 7, further comprising a first photodetector at the first fixed external location and a second photodetector at the second fixed external location.

10. The improvement as in claim 9, further comprising processing means adapted to generate a timing signal in response to a difference between a signal detected by the first photodetector and a signal detected by the second photodetector.

* * * * *